Figure 1:
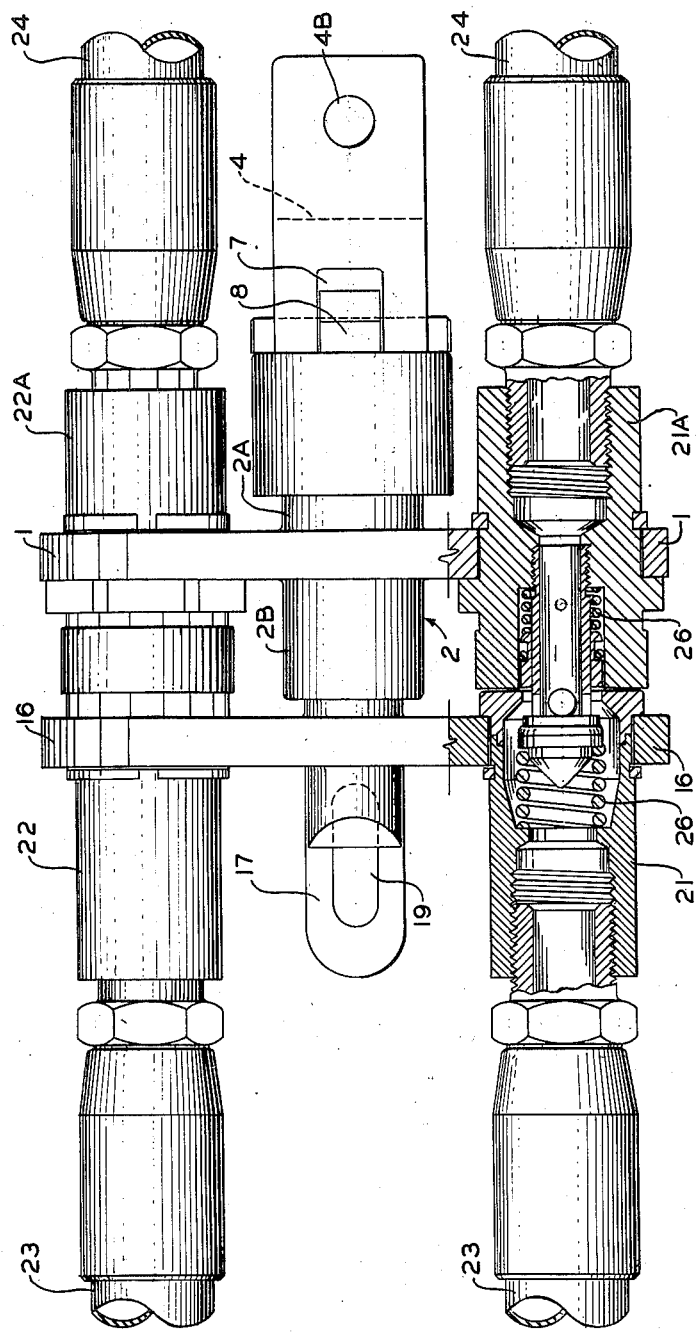

HENRY H MERRIMAN

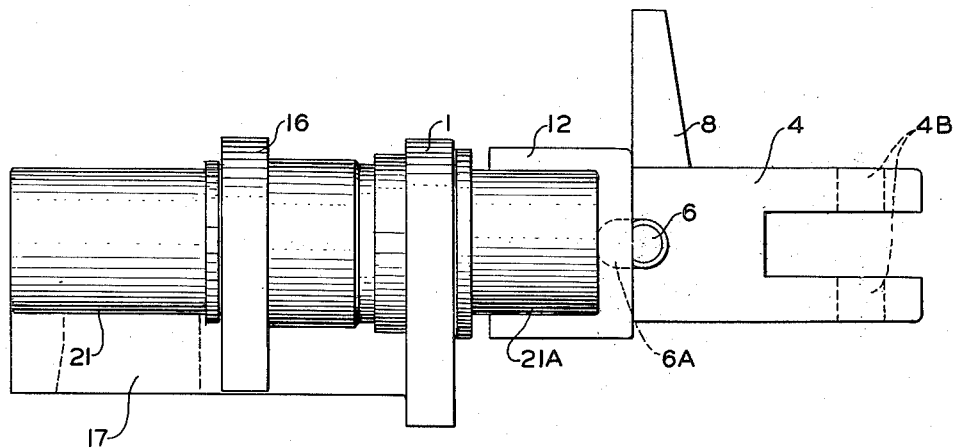
FIG II
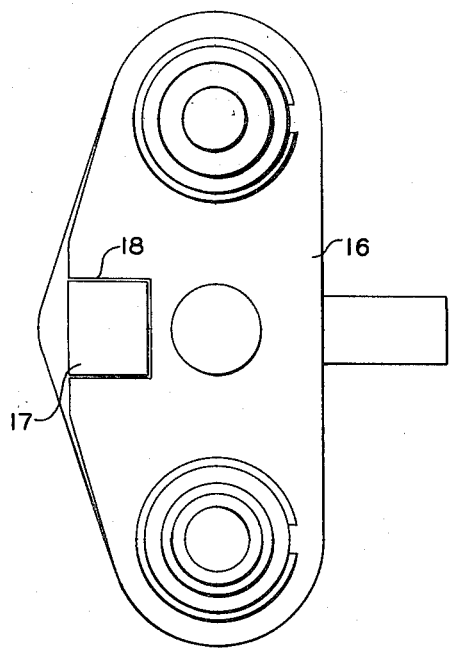
FIG III

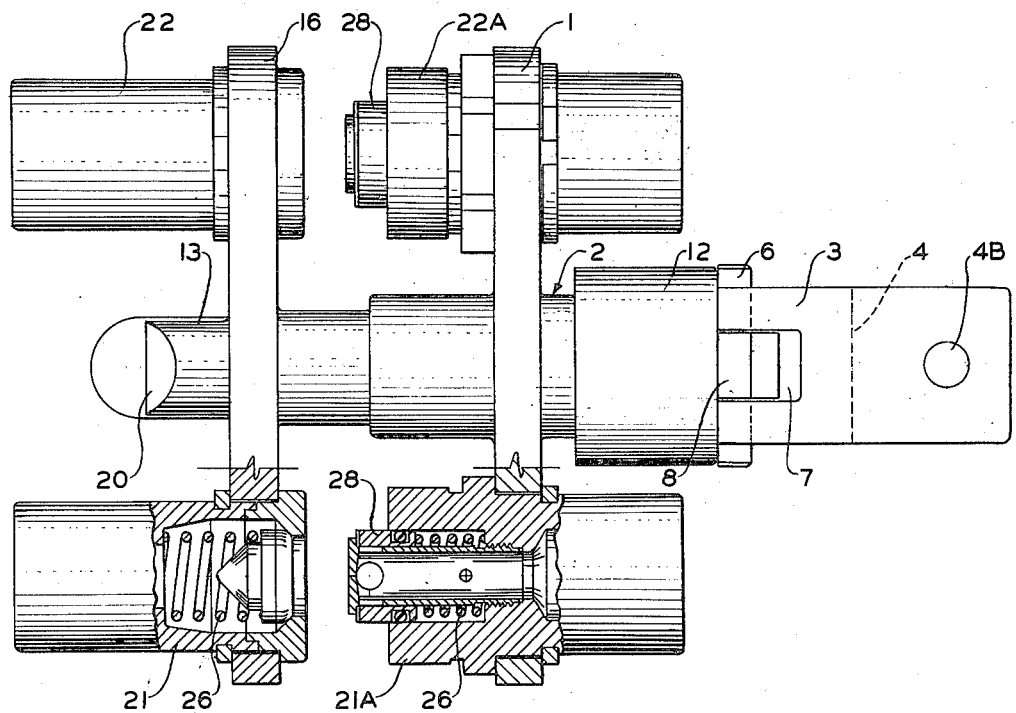
FIG IV
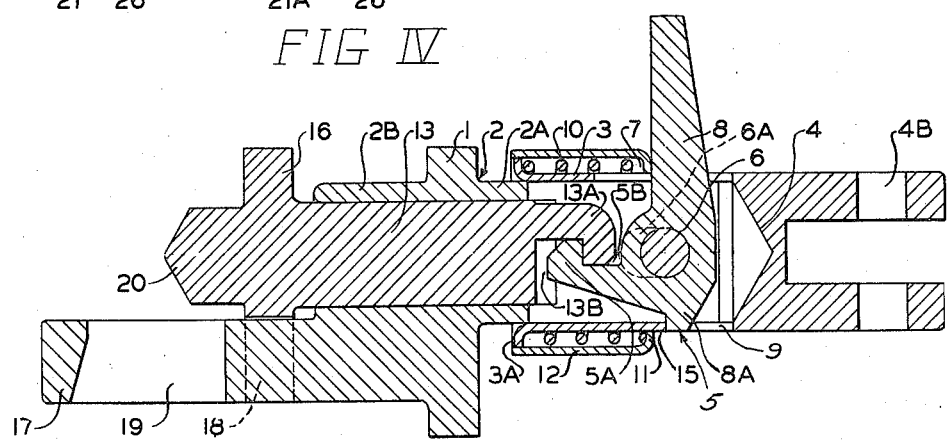
FIG V
Inventor
HENRY H MERRIMAN
By Beaman & Patch

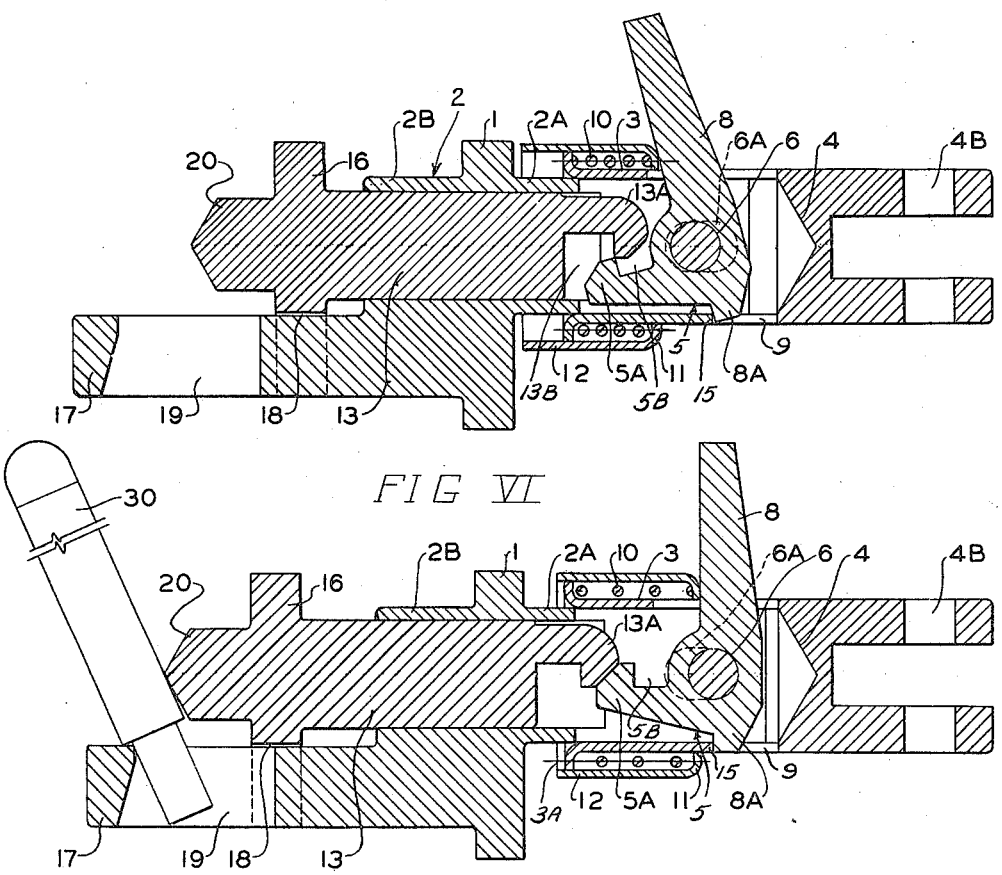

Patented Jan. 16, 1951

2,538,259

UNITED STATES PATENT OFFICE 2,538,259

BREAK-AWAY COUPLING

Henry H. Merriman, Jackson, Mich., assignor to Aeroquip Corporation, Jackson, Mich., a corporation of Michigan Application September 11, 1947, Serial No. 773,373

5 Claims. (Cl. 284—1)

This invention relates to coupling devices such as are employed in connection with fluid pressure pipe lines to hold the coupling halves of a self-sealing coupling normally connected together with their self-sealing valves open, while providing, however, for an automatic disconnection of the coupling halves and hence damage thereto or to their associated pipe lines, upon the occurrence of an excessive external force or strain exerted in the direction of the longitudinal axis of one of the coupling halves or pipe lines.

The invention has for its object to provide an improved and efficient coupling of the above kind in which an excessive or pre-determined external strain or pull on one of the fluid coupling halves will be operative to effect an automatic releasing of separate coupling means by which the fluid coupling halves are normally held coupled together with their self-sealing valves open and this without the introduction of any change in the length of the fluid passageway through the coupling halves, whereby the volume remains constant under all conditions of operation.

The invention also has for its object to provide a coupling of the above kind which is of robust and simple construction, yet which enables the necessary coupling and uncoupling operations to be effected in a rapid, smooth and efficient manner.

These and other objects of the invention will appear more clearly from a consideration of the following detailed description and claims in conjunction with the accompanying drawings in which:

Figure I is a plan view of one embodiment of the invention showing the coupling in operative position to couple together an opposed pair of self-sealing fluid coupling halves, one pair of which is shown in longitudinal section, Figure II is a side elevation of Figure I, Figure III is an end view of Figure I looking on the left hand end thereof, Figure IV is a similar view to Figure I but showing the parts disconnected, Figure V is a longitudinal section through the actual coupling and showing the parts thereof in their operative position, in which they serve to hold the opposed pairs of fluid coupling halves together with the self-sealing valves open, Figure VI is a similar view to Figure IV but showing the parts of the coupling moved to the position where the fluid coupling halves are freed to break apart from each other, with their self-acting valves closed, and Figure VII is a view similar to Figure VI but showing the condition of the parts after separation of the yokes and ready for a fresh coupling connection.

In carrying the invention into effect in one convenient manner as illustrated in the drawings a coupling is provided, adapted for the purpose of coupling together an opposed pair of fluid coupling halves of the self-sealing type (that is, of the type disclosed in U. S. Patents Nos. 2,208,286, and 2,391,022 among others owned by Aeroquip Corporation), which coupling consists of a transverse yoke 1 fixedly carrying at its center a longitudinally extending tubular part 2 which extends to the opposite sides of the yoke to provide a tubular portion 2A and a tubular portion 2B, upon which portion 2A there is slidably mounted a concentric sleeve 3 closed at its outer end by the head 4 of a fork having an eye 4B for a key pin (not shown) by which this part of the coupling is capable of being fixed to a supporting structure, such as to a tractor.

Pivotably mounted within the tubular portion 4 there is a latch member, indicated generally at 5 which is mounted upon a transverse diametral pin 6 supported for limited longitudinal movement with respect to the tubular part 2 by being floatingly engaged at its ends within the slightly elongated diametrically opposite slots 8A in the tubular part. The sleeve 3 is also formed with an elongated slot 7 through which a trip finger 8, fast on the latch 5, extends. The lower stepped end 8A of the trip finger extends also through an elongated slot 9 in the sleeve 3, which latter at one end is formed with an outwardly turned radial flange 3A forming an abutment for one end of a coil spring 10, the opposite end of which spring bears against an inturned radial flange 11 on a collar member 12 concentrically mounted about the sleeve 3 and providing also, by its inturned end flange 11, an abutment for one side of the trip finger 8.

The latch member 5 has a dog 5A forming behind it a recess 5B in which a dog 13A at the inner end of a plunger 13 is engageable, as shown in Figure V, the dog 13A forming, behind it, a recess 13B in which the dog 5A is received during the mutually engaged condition of the dogs 5A and 13A (Figure V) and hence of the pivoted latch member 5 and the plunger 13.

The latch member 5 also has the stepped end portion 8A, which is off-center from the pivot pin 6 and disposed for engagement with an abutment 15, shown as constituted by one end of the slot 9. The plunger 13 is fixedly carried upon another transverse yoke 16 which, in the coupled condition of the parts, extends parallel with the yoke 1 but is separable from the latter when the dogs 5A and 13A are disengaged as shown in Figure VI and as will be described hereinafter.

It may be mentioned here, however, that the yoke 1 is provided with a central longitudinal bar 17 which projects toward the yoke 16 and through a guide slot 18 in the latter and that this bar 17 is formed with an elongated slot 19 which lies immediately beneath a bevelled end 20 of the plunger 13 for the purpose also to be described later.

As above mentioned, this coupling is operative to couple together the opposed halves of a pair of fluid couplings of the self-sealing type (being the well-known Aeroquip self-sealing coupling as disclosed, for instance, in U. S. Patents Nos. 2,208,286 and 2,391,022). The opposed fluid coupling halves are indicated at 21, 21A and 22, 22A with 21 and 22 carried upon the yoke 16, upon opposite sides of the coupling means, and their opposed coupling halves 22 and 22A similarly carried upon the other yoke 1. The arrangement is such that upon the plunger rod 13 being telescoped into the tubular part 2, to effect the required coupled condition of the parts, the opposed fluid coupling halves are brought into register with each other with their self-acting valves in contact and excluding air between them, all as fully disclosed in said prior patents.

In operation and referring first to Figures I and V, the yokes 1 and 16 are held locked against lateral separation due to the locking engagement of the dog 5A of the latch 5 with the dog 13A of the plunger rod 13. In this condition of the parts the opposed pairs of fluid coupling halves 21, 21A and 22, 22A, are also held locked against axial separation with their valves open against the action of their corresponding springs, and the sleeve 3 is held contracted upon its associated tubular part 2.

Assuming now that the thus assembled coupling, complete with its associated fluid pressure lines 23 and 24, is anchored upon a tractor by the engagement of an eye pin (not shown) in the eye 4B with a fixed point on the tractor and that the pipe lines 24 are also coupled to the tractor whereas the pipe lines 23 are coupled to a trailer, itself coupled by any known or conventional coupling means to the tractor, if now the pipe lines 23 are subjected to a predetermined or excessive external pulling force or strain exerted in the direction of the longitudinal axes of the pipe lines and in a direction away from the tractor, this will set up a pulling strain upon the tubular part 2 such as will cause the latter to be moved longitudinally with respect to the sleeve part 3 and against the action of the spring 10. The effective length of the parts 2 and 3 will accordingly be increased in proportion to the pulling force upon the pipe lines 23 until the point is reached when, upon the occurrence of a predetermined or excessive pulling force, the trip finger 8 will have swung completely over to the left by the continued pushing action of the abutment 15 against the stepped end portion 8A of the latch member 5. Consequently, a condition will automatically obtain, such as is shown in Figure VI, when the two dogs 5A and 13A will be completely disengaged and when this occurs the yoke 16 is free to move laterally apart from the yoke 1 to effect a complete separation of the two yokes and hence of the fluid coupling halves, it being understood that the self-sealing valves in the latter will immediately close upon such separation taking place, whereby to prevent any loss of the pressure fluid, and that immediately the plunger 13 has been withdrawn the latch member 5 will also be restored by the action of the spring 19, to its normal position, as shown in Figure VII, in which the dog 5A is positioned for re-engagement with the plunger dog 13A. With the parts of the automatic coupling in the condition shown in Figure VII it is also possible to effect a re-coupling connection. For this purpose it is merely necessary to insert the plunger 13 into the tubular part 2, the plunger being pushed in one direction into the tubular part as the bar 17 is guided within the guide slot 18 to afford proper alignment of the parts. As the plunger 13 is pushed home into the tubular part 2 its dog 13A will cam over the dog 5A of the latch member 5, causing the latter to swing momentarily against the action of the spring 19, until the dog 13A is engaged behind the dog 5A as shown in Figure V. This sliding movement will be accompanied by a telescoping of the projected valve sleeves 28 of the fluid coupling halves 21A, 22A into the ends of their respective opposed coupling halves and at the time when the dog 13A is held latched behind the dog 5A the condition will have been reached where the valves in the opposed fluid coupling halves have been forced open against the action of their springs 26. It will be appreciated, therefore, that to effect the desired re-coupling of the parts, not only has the force of the spring 19 to be overcome but also the combined force of the valve springs 26. Also, when the fluid pipe lines are, as is normal, coupled to their fluid pressure supply, it will be necessary to overcome this force. It is for this purpose that the slot 19 and bevelled end 20 of the plunger are provided as this enables the required connection to be effected with the use of a mechanical leverage by the introduction of a bar or rod 30 (Figure VII) into the slot 19 and the actuation of the same to push backwards against the beveled end 20 as the bar or rod is swung over towards the latter with a lever action.

Although the automatic condition is obtained when an excessive pull is exerted upon the hose lines 23 the same effect is obtainable if the trip lever 8 is kicked back against the prevailing spring and fluid pressures, such as could be accomplished by foot action to swing the trip lever and its latch member into the position shown in Figure VI. Such deliberate actuation of the coupling may be required to be effected, for example, regardless of any external excessive force as above mentioned when it is desired for other reasons to disconnect the fluid pressure lines on the trailer from those on the tractor. In such case the operator or driver of the tractor merely has to press against the trip lever and this may be conveniently effected by foot action.

Also the coupling could be applied to other fluid valve couplings, which need not be of the self-sealing air-excluding type and to arrangements in which only a single opposed pair of fluid coupling halves are required to be coupled together or in which more than two opposed pairs of fluid coupling halves are grouped yoke members capable of being mechanically connected by a common automatic coupling have the features above described.

Having thus described my invention, what I desire to secure by Letters Patent and claim is:

1. In a coupling assembly for fluid pressure lines and of the kind comprising a pair of hollow coupling body parts having self-sealing valves, a first frame structure having a pair of laterally spaced bore portions with substantially parallel axes, one said coupling body part being mounted in one said bore portion, anchorage means on said frame structure adapted to permit the latter, with its associated said coupling body part to be anchored to a relatively fixed structure, a second and separately formed frame structure having a bore portion, the other coupling body part being mounted in said last mentioned bore portion, plunger means on said second frame structure in laterally displaced relationship to the said bore portion thereof and adapted for guided sliding engagement with respect to the other bore portion of the first said frame structure such that when so engaged the two coupling body parts are in axial alignment and are positioned for coupling engagement with each other, and complementary clutch means on said frame structures adapted to hold the latter and their associated coupling body parts coupled together with the valves in the latter open, said clutch means including an automatic release connection adapted to permit the thus coupled body parts and said second frame structure to partake of a limited unified motion relatively to the first said frame structure, at the termination of which motion the clutch means is automatically disengaged to release the coupling body parts for separation.

2. In a coupling assembly for fluid pressure lines and of the kind comprising a pair of hollow coupling body parts having self-sealing valves, a first frame structure having a pair of laterally spaced bore portions with substantially parallel axes, one said coupling body part being mounted in one said bore portion and the other said bore portion being constituted by telescoped portions, anchorage means on said frame structure adapted to permit the latter, with its associated said coupling body part to be anchored to a relatively fixed structure, a second and separately formed frame structure having a bore portion, the other coupling body part being mounted in said last mentioned bore portion, plunger means on said second frame structure in laterally displaced relationship to the said bore portion thereof and adapted for sliding engagement with respect to the other bore portion of the first said frame structure such that when so engaged the two coupling body parts are in axial alignment and are positioned for coupling engagement with each other, and complementary clutch means on said frame structures adapted to hold the latter and their associated coupling body parts coupled together with the valves in the latter open, said clutch means including an automatic release connection adapted to permit the thus coupled body parts and said second frame structure to partake of a limited unified motion relatively to the one telescoped portion of the first said frame structure, at the termination of which motion the clutch means is automatically disengaged to release the coupling body parts for separation.

3. In a coupling assembly for fluid pressure lines, a first frame structure having a tubular bore portion, a pair of coupling body parts mounted upon said frame structure upon opposite sides of said tubular bore portion and in laterally spaced relationship to the latter, anchorage means on said frame structure adapted to permit the latter, with its associated said coupling body parts to be anchored to a relatively fixed structure, a second and separately formed frame structure, a pair of coupling body parts mounted upon said second frame structure and complementary to the coupling body parts on the first said frame structure, spigot means on said second frame structure between said coupling body parts and adapted for guided engagement in said tubular bore portion on the other frame structure and complementary clutch means on said frame structures adapted to hold the latter and their associated coupling body parts coupled together, said clutch means including an automatic release connection adapted to permit the thus coupled body parts and said second frame structure to partake of a limited unified motion relatively to the first said frame structure, at the termination of which motion the clutch means is automatically disengaged to release the coupling body parts for separation.

4. In a coupling assembly for fluid pressure lines, a first frame structure, clutch means on the latter, a coupling body part also carried on said frame structure in laterally spaced relation to said clutch means, said frame structure being adapted for anchoring to a relatively fixed structure, a second and separate frame structure, another coupling body part complementary to said first mentioned coupling body part and carried upon said second frame structure, laterally spaced complementary clutch means on the latter adapted when engaged with the clutch means on the first frame structure to maintain said coupling body parts connected together in axial alignment, complementary guide means incorporated in said frame structures and adapted to position the latter for correct alignment of the clutch parts and the coupling body parts, and means operatively associated with said clutch parts adapted to permit limited unified movement of the one frame structure and the connected coupling body parts relatively to the anchored frame structure.

5. In a coupling assembly for fluid pressure lines, a first frame structure, an elongated hollow section on the latter, said frame structure extending transversely to the longitudinal axis of said hollow section and the latter projecting from one side of said frame structure, clutch means on the latter, a coupling body part also carried on said frame structure in laterally spaced relation to said clutch means, said frame structure being adapted for anchoring to a relatively fixed structure, a second and separate frame structure, another coupling body part complementary to said first mentioned coupling body part and carried upon said second frame structure, laterally spaced complementary clutch means on the latter adapted when engaged with the clutch means on the first frame structure to maintain said coupling body parts in axial alignment, said clutch means incorporating an automatic release connection, a spigot on said second frame structure adapted for engagement in said hollow section to position the two frame structures for correct alignment of the clutch parts and of the coupling body parts, and means operatively associated with said clutch parts adapted to permit limited unified movement of the one frame structure and connected coupling body parts relatvely to the anchored frame structure, at the termination of which said clutch release connection is automatically operative to disconnect the clutch and thereby free the coupling body parts for separation.

HENRY H. MERRIMAN.

REFERENCES CITED

The following references are of record in the file of this patent:

UNITED STATES PATENTS

| Number | Name | Date |
| --- | --- | --- |
| 1,733,146 | Zelk | Oct. 29, 1928 |
| 1,744,612 | Conner | Jan. 21, 1930 |
| 1,876,918 | Gray et al. | Sept. 13, 1932 |
| 1,973,610 | Connors | Sept. 11, 1934 |
| 2,247,843 | Kamenarovic | July 1, 1941 |
| 2,307,427 | Smith et al. | Jan. 5, 1943 |
| 2,309,890 | Fisher | Feb. 2, 1943 |
| 2,409,650 | Wiggins | Oct. 22, 1946 |
| 2,425,500 | Wiggins | Aug. 12, 1947 |
| 2,441,363 | Krueger | May 11, 1948 |